United States Patent [19]
Bridgeford

[11] 3,917,862
[45] Nov. 4, 1975

[54] METHOD FOR PATCHING EDIBLE ARTIFICIAL COLLAGEN SAUSAGE CASINGS

[75] Inventor: Douglas J. Bridgeford, Champaign, Ill.

[73] Assignee: Tee-Pak, Inc., Chicago, Ill.

[22] Filed: Apr. 8, 1974

[21] Appl. No.: 458,724

[52] U.S. Cl. ............... 426/274; 426/140; 426/278; 426/284
[51] Int. Cl.² ............................................ A23L 1/31
[58] Field of Search ........... 426/105, 135, 140, 274, 426/276, 277, 278, 282, 302, 284; 156/94, 156/244, 252

[56] References Cited
UNITED STATES PATENTS

| | | |
|---|---|---|
| 2,210,436 | 8/1940 | Weingand et al. .................. 426/135 |
| 3,575,339 | 4/1971 | Kupcikevicius ................. 426/140 X |
| 3,669,791 | 6/1972 | Bridgeford .......................... 156/244 |
| 3,679,436 | 7/1972 | Oppenheimer et al. ............ 426/135 |

OTHER PUBLICATIONS
"The Condensed Chemical Dictionary," 1966, Published by Van Nostrand Reinhold Co., New York, pp. 244 & 245, *Crotonaldehyde* and p. 412, *Gelatin*.

*Primary Examiner*—Hyman Lord
*Attorney, Agent, or Firm*—Neal J. Mosely; Russell L. Brewer

[57] ABSTRACT

This invention relates to an improvement in a basic process for producing artificial collagen sausage casings. In the basic process, casings are extruded through an annular die, perforated on an intermittent basis for release of fluids which accumulate therein, the perforations patched with an adhesive to provide an air tight seal, and then the casings inflated with air for drying. The improvement in this basic process comprises employing gelatin as an adhesive and in a preferred embodiment of the invention, crosslinking the gelatin to provide additional strength to the patch.

7 Claims, 2 Drawing Figures

METHOD FOR PATCHING EDIBLE ARTIFICIAL COLLAGEN SAUSAGE CASINGS

DESCRIPTION OF THE PRIOR ART

In the manufacture of continuous seamless artificial collagen sausage casings, the casings are continuously extruded through an annular die into a coagulating bath. During the coagulation and processing steps of the process, fluids in the form of liquid and gases accumulate inside the tubular casing. These fluids must be released periodically in order to maintain a constant diameter in the casing and to permit drying of the casing to form reel stock.

In order to effect release of these fluids from inside the casing, the casings are punctured or perforated before they enter the coagulating tank. This is done intermittently, e.g., every 30 to 60 minutes. The punctures generally are in the form of a slit 2–12 inches in length or comprise a plurality of small holes. Thus, as the casing passes through the coagulating bath the fluids which have accumulated in the casing are released through the perforations to the bath. After the casing has completed the processing cycle, it is inflated with air, dried, and wound onto a reel to form reel stock. The stock then is shirred and sold to the meat processor.

Drying of a tubular casing is somewhat difficult and requires special care. It is customary to inflate the casing and then pass the inflated casing through a dryer for reducing the moisture content to a desired level. Of course, the puncture in the casing must be patched if the casing is to be inflated with air. Several approaches have been employed for sealing the puncture or perforation.

Commercially, it has been customary to cut out that section of casing containing the puncture by cutting the casing transverse to the longitudinal axis. A hollow rubber coupling then is inserted into the two ends of the casing and the ends of the casing tied about the coupling. This coupling, because of its flexibility and because it is hollow, permits the casing to be passed through Bull Rolls positioned at the entrance and at the end of the dryer section for maintaining the casing in the dryer in an inflated condition and permits the casing to be inflated with air. The coupling is removed from the casing by severing the casing, usually transverse to the longitudinal axis, and the casing joined to form an integral piece by butting the two ends of the casing together and joining these ends with tape. The patched casing is wound onto a reel as flat stock.

A second approach for sealing a puncture in the casing has been to patch the punctured area by applying an adhesive material to the casing. Examples of adhesives which have been tried in the past but have been found unsuitable because of (a) poor adhesion to the casing and (b) long "set" times for achieving desired adhesion include: rubber, polymeric compositions, glues, and viscose. In preferred embodiments, these adhesives were applied to a flexible material and the flexible material placed over the perforated area to form a patch.

Another approach for removal of accumulated fluids in tubular sausage casing comprised introducing a plurality of small perforations, i.e., holes in the casing instead of a long slit and then sealing these holes with a patch of a flexible material secured with a water activated adhesive. Examples of water activated adhesives include alpha cyanomethyl acrylate, finely divided carboxymethyl cellulose, sodium alginate, polyvinyl alcohol, and cellulose xanthate.

Ideally, the patch approach to the sealing of the perforations introduced into artificial sausage casings is preferred because that section of casing including the patch might ultimately be used for stuffing by the meat processor. Casings which have been made by the insertion of a hollow rubber coupling and joined together by tape cannot be used by the processor as the joint does not have sufficient strength to withstand the stuffing operation. Thus, the section of casing containing the joint is discarded to waste unless there is sufficient length to sell to specialty shops.

Secondly, the patching operation can reduce the manpower required to produce a finished product. In the coupling operation one man is required to insert the coupling and another man is required to remove the coupling and join the casing together on removal of the coupling. If a suitable patching operation could be found only one step, i.e., that of applying the patch to the perforation would be required. An ancillary feature of the patching technique is that the patch permits shirring of the casing without fear of breakage. On the other hand, particularly where the coupler method has been employed the tape often catches on the mandrel surface causing the casing to break or sever. This results in shirring "downtime" and reduced production.

SUMMARY OF THE INVENTION

This invention relates to an improvement in a process for forming artificial sausage casings, particularly edible collagen casings. The basic process comprises extruding the casings through an annular die, perforating the extruded casing on an intermittent basis for removal of accumulated fluids, patching the perforations with an adhesive for providing an air tight seal, and then inflating the casing for drying. The improvement in this basic process comprises empolying gelatin as the adhesive.

Advantages of the process of this invention include: an adhesive which is relatively inexpensive for patching artificial sausage casing; an adhesive which is edible and therefore suitable for patching edible sausage casings; an adhesive which has excellent strength; an adhesive which is easy to apply to the casing; an adhesive which has a fast rate of development of adhesive strength; an adhesive which requires very little and inexpensive equipment to effect sealing of the perforations in the casing; an adhesive for providing a patch which can withstand normal shirring operations without substantial frequency of breakage; an adhesive for providing a patch on artificial sausage casings which can withstand meat processing operations thereby reducing waste, and, an adhesive which is substantially transparent for producing clear patches or can be pigmented to match the color of the tubular casing.

THE DRAWINGS

DESCRIPTION OF THE PREFERRED EMBODIMENTS

Figure 1:
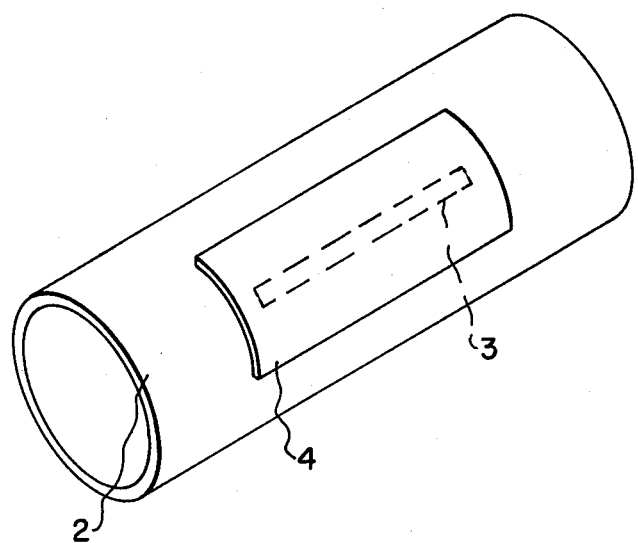
FIG. 1 is an isometric view of a tubular casing having a longitudinal perforation sealed with an overwrap of a flexible material and bonded to the casing with gelatin.
Figure 2:
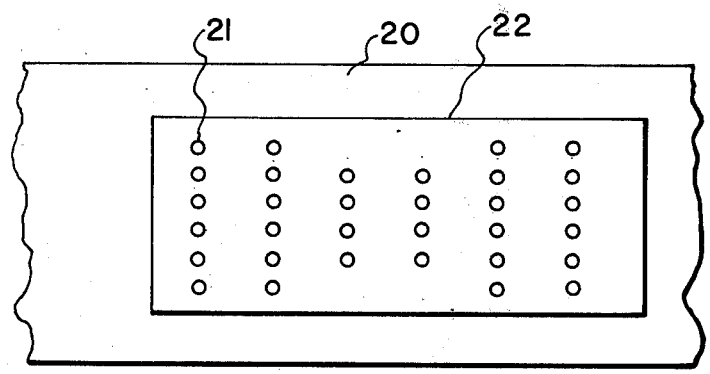
FIG. 2 is a plan view of a portion of a casing having multiple perforations therein covered with an overwrap of a flexible material with the overwrap bonded to the casing via the gelatin adhesive.

This process for producing artificial sausage casings can be applied to primarily edible collagen casings. The invention is particularly advantageous for the preparation of edible collagen sausage casings because the adhesive is edible and therefore the patch can be used for producing commercially acceptable edible casing.

Virtually any grade gelatin can be used for sealing the perforations in artificial sausage casings of the type contemplated by this invention. However, it is preferred that the gelatin have a Bloom from 50 to 350. When the Bloom is below about 50, the gelatin does not set or adhere to the casing within the desired time period for commercial casing manufacture. With additional time the casing can be secured with the lower Bloom gelatin but generally these time periods are not commercially acceptable. When the Bloom is higher than 350, operating conditions for patching and the viscosity of the gelatin adhesive are too high. Also, tests showed that as the Bloom increased, set times were longer and sometimes resulted in reduced adhesion.

In preferred embodiments of the invention the gelatin is reacted with a crosslinking agent to provide a tougher and stronger patch. Not only does the crosslinking agent improve the overall strength characteristics of the gelatin but it improves the bonding of the adhesive, and if a flexible patching material is employed, it improves the bonding of this patching material to the casing.

Virtually any crosslinking agent suitable for crosslinking gelatin can be used in practicing this invention. These crosslinking agents include polyvalent metal salts such as iron, aluminum, zirconium, chromium and other metal salts. Another class of crosslinking agents include dialdehydes, both unsaturated and saturated dialdehydes. Although virtually any of the crosslinking agents suitable for crosslinking gelatin can be used in practicing the invention, there are several criteria used for commercial acceptance of the crosslinking agent. These criteria include: (1) that the crosslinking agent does not cause discoloration of the final product, (2) the crosslinking agent is not toxic (preferably edible), and (3) the crosslinking agent has sufficient reactivity to set the gelatin within tolerable commercial standards.

The dialdehydes are the preferred class of crosslinking agents and they include acetaldehyde; acrolein; aldose sugars; aromatic aldehydes such as benzaldehyde, cinnamaldehyde, coniferyl aldehyde, crotonaldehyde, dihydroxy benzaldehyde, fumaric aldehyde, furfural, piperonal, protocatechualdehyde, salicylaldehyde, glutaraldehyde, and glyoxal. Of the above glyoxal or glutaraldehyde are the preferred crosslinking agents for gelatin. These aldehydes result in a transparent adhesive, that is edible and non-toxic, and they react with relatin within seconds to form a tough, flexible, crosslinked adhesive.

Any of the conventional patching processes for artificial sausage casing can be employed for practicing this invention. One technique for patching the casing is to apply the gel in liquid form by brushing the liquid over the perforated area and permitting the gelatin to solidify and seal the perforation. When a crosslinking agent is employed in conjunction with the gelatin, the crosslinking agent can be applied by brushing as a thin film over the artificial sausage casing and then a thin layer of gelatin applied over the top of the coated area. Another technique which is well suited for dialdehyde crosslinking agents is to form a solution tion of the dialdehyde and gelatin and then brush or spray the solution over the perforation and immerse the coated casing into an acid bath.

In a preferred embodiment of the invention, a flexible patching material is applied over the perforation to provide additional support for the casing. The gelatin then is used to bond the flexible material to the casing. This aspect is more fully described in the examples and in the description of the drawings.

Representative flexible materials suitable for patching artificial sausage casing of the type contemplated herein include: cotton cloth, regenerated cellulosic film (cellophane), reinforced regenerated cellulose casing, tissue paper, collagen casing, and coated cellulosic film such as those coated with a polyamide-epichlorohydrin resin, e.g., the reaction product of adipic acid, diethylene triamine, and epichlorohydrin. When patching edible collagen casing, it is preferred that an edible flexible material, e.g., collagen casing, be employed. This permits the patched section to be included in the casing and eliminates waste.

For purposes of coating the punctured casings or applying the patches thereto, the gelatin is converted to a liquid solution which can be brushed or sprayed onto the casing or patching material for effecting the sealing of the perforation. Normally, a solution having from about 1 to 30% gelatin by weight and having a Bloom of from 50 to 350 is sufficient to accomplish this result. When the solution concentration exceeds about 30% gelatin, there is a tendency for the viscosity of the solution to be too high; therefore, it must be heated to keep it at a lower viscosity and in solution. When the proportion of gelatin in the solution is below about 1%, there often is insufficient gelatin applied to the perforated area for effecting adequate sealing of the perforation and for bonding the patching material to the casing if such patching material is employed.

When employing a crosslinking agent in combination with the gelatin to provide a more tenaciously adhering adhesive, it is preferred to temporarily warm the mixture (30°-60°C.) of crosslinking agent and gelatin to effect rapid crosslinking. When the combination is warmed, crosslinking times of from 5–20 seconds usually are sufficient to secure the adhesive to the casing. Longer crosslinking times are noted when the mixture is cured at room temperatures.

The following examples are provided to illustrate preferred embodiments of the invention and are not intended to restrict the scope thereof. All parts are parts by weight and all percentages are expressed as weight percentages.

EXAMPLE I

In reference to FIG. 1, a gel collagen casing 2 having a ½" longitudinal slit 3 inserted therein to permit release of fluids is produced in conventional manner. A 10% acidified glutaraldehyde solution in water having a pH of 2 is applied to the casing by brushing the solution over the slit area (about 5% glutaraldehyde based on the gelatin to be applied).

A section of flat collagen casing 4, usually taken from scrap, is coated with a 1 to 2 mil thick layer of 4% solution of gelatin (Bloom 275) in water and then the gelatin coated collagen casing 4 placed over the glutaraldehyde coated area of the casing. The collagen section 4 is pressed down against the casing 2 to avoid curling of the collagen patch 4 at the edges and to avoid wrinkling. The patched area of casing is heated with a hot (35°-40°C.) air blower for about 6 to 8 seconds. The casing 2 then is turned over and a similar patch applied over the slit on the opposite side of casing 2. After patching, the casing can be inflated to appropriate pressure, e.g., 0.5–1 pound/in.$^2$ for drying.

The patched casing has the advantage that it can be shirred and because it is edible it can be utilized by the meat processor in the stuffing operation. On the other hand, casings prepared in conventional manner, i.e., by patching with water-sensitive adhesives or joined by a coupler and patched with tape cannot be used by the meat processor and are thrown to scrap.

EXAMPLE II

A gel collagen casing having a plurality of small holes, e.g., about 1/16" in diameter, for permitting release of fluids is coated with a 10% acidified glyoxal solution in water having a pH of about 2. A tissue paper is coated with a 15% solution of gelatin (150 Bloom) in water by spraying the solution over the tissue paper. The thin layer of gelatin containing solution is about 2–3 mils in thickness. The proportion of glyoxal is about 5% by weight of the gelatin. The coated tissue paper is laid over the glyoxal coated area of the casing and pressed against this area to effect sealing and patching of the perforated casing. After the tissue paper has been applied to the casing, the patch area is heated to a temperature of about 35°-40°C. for a hot air blower to effect crosslinking of the glyoxal with the gelatin. Generally this takes about 6–10 seconds. This set time is substantially lower than other conventional polymeric adhesives employed in the patching of casing.

The patched casing can be inflated and passed through a dryer without rupture. This film then is wound onto a reel. The reel stock then is shirred on a conventional shirring machine and it is noted that there is a very low frequency of breakage of the casing at the patched section. This is a major concern with the patches disclosed in the prior art as these patches often failed during shirring. The casing also is edible whereas casings prepared by conventional methods are not.

What is claimed is:

1. A method for producing edible artificial sausage casings of collagen comprising slitting or perforating said casings while in the gel state on an intermittent basis for removal of accumulated fluids in such casings, patching with an adhesive consisting of 50–350 Bloom gelatin to provide an air tight seal and then inflating for drying.

2. The method of claim 1 wherein a flexible material is applied over the slit or perforated area of said casing and bonded thereto with said gelatin adhesive.

3. The method of claim 2 wherein said gelatin is crosslinked with a crosslinking agent which is non-toxic after reaction with gelatin.

4. The method of claim 3 wherein said crosslinking agent is a dialdehyde.

5. The method of claim 4 wherein said flexible material is of collagen.

6. The method of claim 5 wherein said dialdehyde is glutaraldehyde.

7. The method of claim 5 wherein said dialdehyde is glyoxal.

* * * * *